United States Patent
Danisevskis

(10) Patent No.: US 10,755,677 B2
(45) Date of Patent: Aug. 25, 2020

(54) DISPLAY OF A FORGERY-PROOF INDICATOR

(71) Applicant: DEUTSCHE TELEKOM AG, Bonn (DE)

(72) Inventor: Janis Danisevskis, Berlin (DE)

(73) Assignee: DEUTSCHE TELEKOM AG, Bonn (DE)

( * ) Notice: Subject to any disclaimer, the term of this patent is extended or adjusted under 35 U.S.C. 154(b) by 851 days.

(21) Appl. No.: 14/653,858

(22) PCT Filed: Dec. 20, 2013

(86) PCT No.: PCT/EP2013/077635
§ 371 (c)(1),
(2) Date: Jun. 19, 2015

(87) PCT Pub. No.: WO2014/096334
PCT Pub. Date: Jun. 26, 2014

(65) Prior Publication Data
US 2015/0348515 A1 Dec. 3, 2015

(30) Foreign Application Priority Data
Dec. 21, 2012 (EP) .................................... 12199132

(51) Int. Cl.
*G09G 5/39* (2006.01)
*G06T 1/60* (2006.01)
(Continued)

(52) U.S. Cl.
CPC .................. *G09G 5/39* (2013.01); *G06F 3/14* (2013.01); *G06F 21/57* (2013.01); *G06F 21/64* (2013.01);
(Continued)

(58) Field of Classification Search
CPC .......... G09G 5/393; G09G 5/39; G09G 5/395; G09G 5/363; G06T 1/60
See application file for complete search history.

(56) References Cited

U.S. PATENT DOCUMENTS 5,949,432 A 9/1999 Gough et al.
7,627,757 B2 * 12/2009 Adams ................ H04L 12/2602
709/206

(Continued)

OTHER PUBLICATIONS

"Method and System of Showing IM User head Portrait on the Taskbar to Identify the Messages Sender", ip.com Journal, ip.com Inc., West Henrietta, NY, US, Jul. 11, 2012 (Jul. 11, 2012), XP013152465.

(Continued)

*Primary Examiner* — Abderrahim Merouan
(74) *Attorney, Agent, or Firm* — Leydig, Voit & Mayer, Ltd.

(57) ABSTRACT

A method for displaying a secure or forgery-proof identity indicator on a screen using a display controller displaying the content of a memory unit of the graphic circuit on the screen, includes: drawing, by a client application, a graphic to be displayed on the screen into a client-specific region of the memory unit of the graphic circuit; drawing an identity indicator belonging to the client application into a memory region outside of the client-specific region; displaying the client-specific region of the memory unit of the graphic circuit on the screen; and simultaneously displaying the identity indicator from the memory region outside of the client-specific region on the screen. For displaying the identity indicator from the memory region outside of the client-specific region, access is only possible from the display controller such that the display of the identity indicator is secure or forgery-proof.

8 Claims, 4 Drawing Sheets

(51) Int. Cl.
*G09G 5/36* (2006.01)
*G06F 3/14* (2006.01)
*G09G 5/397* (2006.01)
*H04N 5/445* (2011.01)
*H04N 21/426* (2011.01)
*H04N 21/475* (2011.01)
*G06F 21/57* (2013.01)
*G06F 21/64* (2013.01)
*G09G 5/14* (2006.01)

(52) U.S. Cl.
CPC ............... *G06T 1/60* (2013.01); *G09G 5/36* (2013.01); *G09G 5/363* (2013.01); *G09G 5/397* (2013.01); *H04N 5/44504* (2013.01); *H04N 21/42653* (2013.01); *H04N 21/4753* (2013.01); *G09G 5/14* (2013.01); *G09G 2340/12* (2013.01); *G09G 2358/00* (2013.01); *G09G 2360/18* (2013.01)

(56) References Cited

U.S. PATENT DOCUMENTS

| | | | | |
|---|---|---|---|---|
| 9,059,972 | B2* | 6/2015 | Redpath | H04L 63/0428 |
| 2003/0212833 | A1* | 11/2003 | Lapp | G06F 21/6218 |
| | | | | 719/315 |
| 2005/0168471 | A1 | 8/2005 | Paquette | |
| 2006/0130026 | A1* | 6/2006 | McHugh | G06F 17/212 |
| | | | | 717/141 |
| 2010/0020969 | A1* | 1/2010 | Huin | H04N 7/163 |
| | | | | 380/239 |
| 2010/0299525 | A1* | 11/2010 | Shah | H04L 63/0428 |
| | | | | 713/171 |
| 2013/0283373 | A1* | 10/2013 | Zisapel | H04L 63/1441 |
| | | | | 726/22 |
| 2014/0013106 | A1* | 1/2014 | Redpath | H04L 63/0428 |
| | | | | 713/156 |

OTHER PUBLICATIONS

Epstein J et al: "Evolution of a trusted B3 window system prototype", Porceedings of the Computer Society Symposium on Research in Security and Privacy, Oakland, May 4-6, 1992; [Proceedings of the Computer Society Symposium on Research in Security and Privacy], Los Alamitos, IEEE Comp. Soc. Press, US, vol. SYMP. 13, May 4, 1992 (May 4, 1992), pp. 226-239, XP010029013.

MacKenna C et al: "A Bit-mapped Processor Providing Hardware Windowing and Fast Text Display", WEscon Technical Papers, Western Periodicals Co. North Hollywood, Us, vol. 30, Nov. 18, 1986 (Nov. 18, 1986), pp. 3/0201-14-14, XP000111653.

* cited by examiner

DISPLAY OF A FORGERY-PROOF INDICATOR

CROSS-REFERENCE TO RELATED APPLICATIONS

This application is a U.S. National Phase application under 35 U.S.C. § 371 of International Application No. PCT/EP2013/077635, filed on Dec. 20, 2013, and claims benefit to European Patent Application No. EP 12199132.7, filed on Dec. 21, 2012. The International Application was published in German on Jun. 26, 2014 as WO 2014/096334 A1 under PCT Article 21(2).

FIELD

The invention relates to a method for displaying a forgery-proof or secure identity indicator. In particular the invention relates to the use of a framebuffer overlay implemented by hardware for displaying a forgery-proof identity indicator. For example the display of a forgery-proof indicator for the identity of applications may be provided by using an overlay functionality of display controllers according to the invention.

BACKGROUND

When a display is shared among a plurality of applications, it is possible that one application pretends to be another application in order to make the user reveal confidential information, such as for example a personal identification number (PIN) or security code. This approach of an attacker is known as phishing. A forgery-proof or non-forgeable identity indicator can mitigate or solve this problem by displaying to the users anytime the application they actually view at the screen. The user may then decide whether this application is trustworthy or not.

For a forgery-proof identity indicator to fulfil its function the respective computer system or a trustworthy component thereof has to be able to determine the identity of an application and to name it for the user. Furthermore, the application as such must not influence the indicator.

Commercially available operating systems such as Windows7 or window managers based on Xorg have no possibility to determine the identity of an application. In these systems, every indicator about the identity of an application (e.g. window header or taskbar entry) is filled with content by the respective application itself and thus easily forgeable by a vicious application.

This problem of "not trustworthy" applications is not sufficiently dealt with in current operating systems. The following literature describes this problem and also the concept of non-forgeable identity indicators:

Jonathan S. Shapiro, John Vanderburgh, Eric Northup, and David Chizmadia. Design of the eros trusted window system. In USENIX Security Symposium, pages 165-178, 2004. (https://www.usenix.org/legacy/event/sec04/tech/full_papers/shapiro/shapiro.pdf).

N. Feske and C. Helmuth. A nitpickers guide to a minimal-complexity secure gui. In Proceedings of the 21st Annual Computer Security Applications Conference, pages 85-94, 2005 (http://www.acsac.org/2005/papers/54.pdf).

SUMMARY

In an embodiment, the present invention provides a method for displaying a secure or forgery-proof identity indicator on a screen using a display controller, part of a graphic circuit, displaying the content of a memory unit of the graphic circuit on the screen. The method includes: drawing, by a client application, a graphic to be displayed on the screen into a client-specific region of the memory unit of the graphic circuit; drawing an identity indicator belonging to the client application into a memory region outside of the client-specific region; displaying the client-specific region of the memory unit of the graphic circuit on the screen using the display controller; and simultaneously displaying the identity indicator from the memory region outside of the client-specific region on the screen using an overlay functionality of the display controller. For displaying the identity indicator from the memory region outside of the client-specific region, access is only possible from the display controller such that the display of the identity indicator is secure or forgery-proof.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figures 1A, 1B:
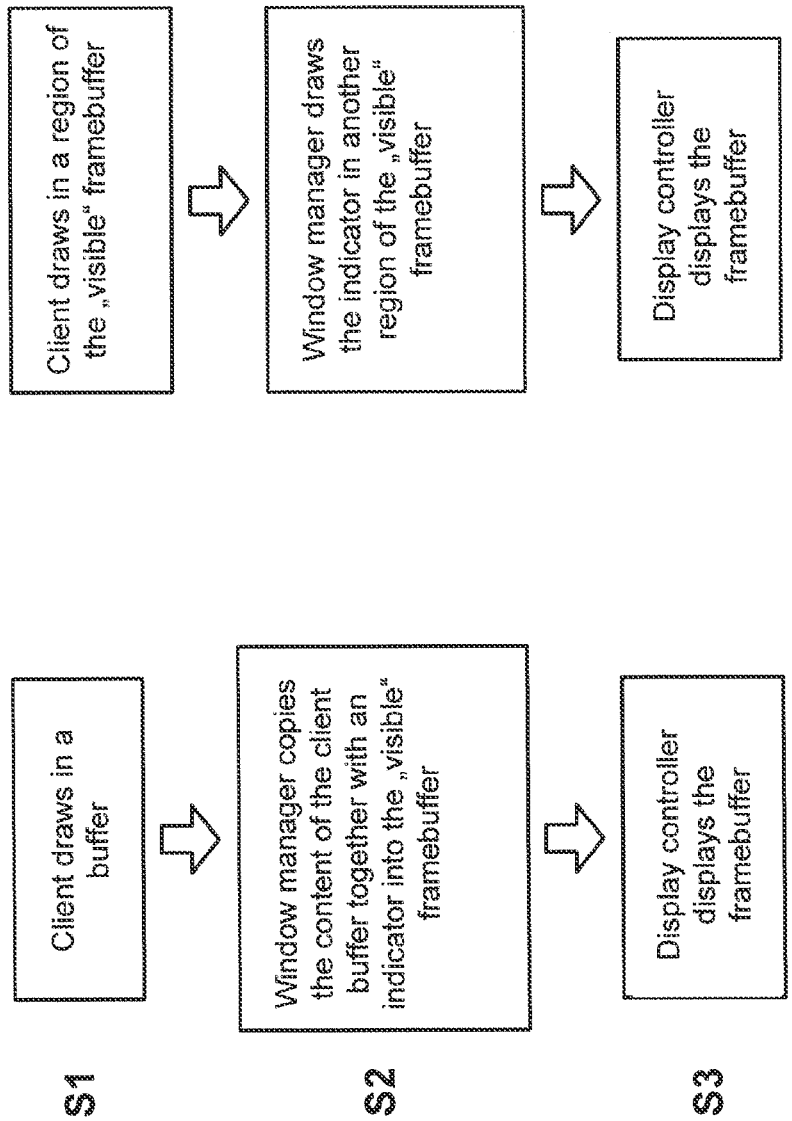
FIG. 1a is a flow diagram of a conventional method where a framebuffer administrator copies the content of a buffer in the visible framebuffer in order to display an indicator on the screen.
FIG. 1b is a flow diagram of a conventional method where visible framebuffers are organised by memory address alignment to display an indicator on the screen.

At first some terms are defined as should be understood according to the present invention.

A display controller is usually a device or part of a device, preferably a circuit, which reads the digital representation of a graphic from a display memory (framebuffer, graphic memory) and displays the graphic on a screen (monitor, display) according to the stored digital information. In PCs or laptops the display controller is typically part of a graphic board. According to the invention, the display controller is not to be restricted to a circuit within a graphic board. For example, a display controller according to the present invention can also be situated elsewhere, in particular on a SoC (system on a chip). A system on a chip (SoC), or system on chip, means the integration of all functions or a large part of the functions of a system on a chip (die), i.e. an integrated circuit (IC) on a semiconductor substrate, also called monolithic integration. Whereas systems initially consisted of a microprocessor or microcontroller IC and many other ICs for specific functions, which had been soldered onto a circuit board, the nowadays possible integration density allows the implementation of a plurality of functions, if necessary even all important functions on a single IC. Here digital, analogue and mixed signal functional units are integrated. Advantages are in particular costs savings, reduced energy consumption or power loss and comprehensive miniaturisation. Nowadays, e.g. the digital function in mobile phones, possibly with the exception of the memory, is realised on an IC. The interfaces, too, e.g. to a keyboard, to the SIM card or the display can already be contained on this IC.

A similar technique in order to achieve high integration densities also of components of highly differing techniques is the so-called system in package (SiP). Here a plurality of chips are enclosed in a package.

Thus, according to the invention, a display controller is not restricted to a certain hardware realisation.

A framebuffer is a memory or memory region, preferably a screen buffer within a graphic board containing the digital representation of the graphic to be displayed. In other words, at least a part of the framebuffer corresponds to a digital copy of the screen, i.e. any screen pixel can be assigned a certain region of the framebuffer containing its digitally translated color value. According to the present invention, a framebuffer is to be visible if the display controller reads out said region of the framebuffer, preferably a regular readout and display on the screen. Moreover, in addition to the visible framebuffer, a framebuffer can comprise an additional memory region called buffer in the following wherein the buffer's content is usually not read out directly for displaying the content on the screen.

Further, the term framebuffer is not restricted to a certain hardware realisation. With reference to the above-mentioned SoCs, the framebuffer may also be, e.g. a main memory of the SoCs.

An overlay is the ability allowing a display controller to additionally display at least one further digital representation of a graphic stored, e.g. in a buffer and to thus crossfade the first display based on the visible framebuffer, e.g. in an opaque, transparent or partial transparent manner. Consequently, the overlay function may be used, e.g. in addition to the display of an image from the framebuffer to read and display a further image directly from a bus (e.g. a camera). The overlay function is used, e.g. in cameras of mobile phones or digital cameras since thus the latency between the camera and the display can be reduced.

Moreover, an overlay function of a display controller is known which, according to documentation, can be used for showing the television program number in TV sets. Preferably, the method according to the invention uses this overlay function. However, according to the invention, this overlay function is specifically used to control a "non-forgeability" and display it on the screen. This overlay function is used by a corresponding computer program or an application, respectively.

An indicator according to the invention is said to be forgery-proof or non-forgeable or secure when an attempt at forgery can be exposed anytime by the user, e.g. because an indicator is displayed without interaction by the user or the indicator hardware (e.g. a display region) escapes control by the, potentially forging, application. In particular according to the invention, the overlay functionality of the display controller is used in order to display the forgery-proof or non-forgeable or secure indictor on the screen. Here, e.g. the protection against forgery is achieved in that the display controller, e.g. hardware, escapes control by potentially forging applications. In other words, the invention can display a forgery-proof identity indicator by using a framebuffer overlay implemented by hardware.

In order to display a forgery-proof indicator, systems are already known which are divided into a secure subsystem and an unsecure subsystem. The division is made, e.g. by virtualisation in secure and unsecure regions, wherein additional hardware e.g. a red and a green LED indicates which subsystem is active, in particular which subsystem is responsible for the display on the screen. The secure subsystem is sometimes called green, whereas the unsecure subsystem is called red. Such systems are often called red/green systems.

The article "*Lockdown: Towards a Safe and Practical Architecture for Security Applications on Commodity Platforms*" by A. Vasudevan et al., published in Trust and Trustworthy Computing, Lecture Notes in Computer Science volume 7344, 2012, pages 34-54, describes a red/green system where division is not based on virtualizing but partitioning.

Apart from the above-mentioned hardware indicators for red/green systems, there are already solutions which use the screen as such for displaying an identity indicator. FIG. 1a shows in an example the basic steps of an already known solution in a flow diagram. In particular, a trustworthy software component (hereinafter called framebuffer administrator) has control over the framebuffer. First of all, this framebuffer administrator allows all applications, i.e. trustworthy applications and untrustworthy applications to write in a buffer (Step S1: client draws in buffer). In the following the writing process in a buffer region of the framebuffer or the buffer is also described as "drawing". The buffer is not part of the visible framebuffer.

For display on the screen the trustworthy software component framebuffer administrator copies the content of this additional buffer into the visible framebuffer (Step S2). The framebuffer administrator additionally supplements an indicator at always the same place in the framebuffer. In addition to the content to be displayed, an indicator, too, is copied into the "visible framebuffer".

The display controller reads out the visible framebuffer and displays the content on the monitor (Step S3). Since the indicator is written at always the same place in the framebuffer, the indicator is displayed at always the same place on the screen. This indicator is an identity indicator showing the user which application is responsible for the content of the display.

Application in the present case means an application software (abbr. app) or a computer program which can be used to execute or support a useful or desired non-systemwise functionality, i.e. the application is used to "solve user problems". Examples for application fields are: image processing, video processing, text processing, spreadsheet processing, computer games, specific operational functions such as financial accounting, goods issue, etc.

This copy process from the buffer into the visible framebuffer, however, leads to an increased computing effort and thus to an increased energy consumption and is therefore undesirable in particular in embedded systems.

In order to avoid such copy processes, there are also approaches where the framebuffer is divided to page granularity by means of a memory management unit isolation (MMU isolation) and thus is partly made available to the not trustworthy applications (see FIG. 1b). In particular MMUs translate memory addresses from virtual addresses into physical addresses. Therefor MMUs use databases, the so-called page tables. If an entry were made into these tables for every possible address, a table would be greater than the memory unit it manages. Accordingly, the memory unit is divided into tiles with fixed size (4096 bytes are a very common size). Now only the start addresses of said tiles are entered into the tables. For easier determination which table entry is valid for a specific virtual address, only multiples of the tile size are allowed as start addresses (alignment). Simplified: <virtual address>/<tile size>=<index in page table>. The remainder is the index within the tile.

"Page" is the virtual area which is depicted on a physical "tile". Thus, the division of memory areas (address space isolation) via MMU is only possible with a granularity corresponding to the tile/page size.

Figure 1C:
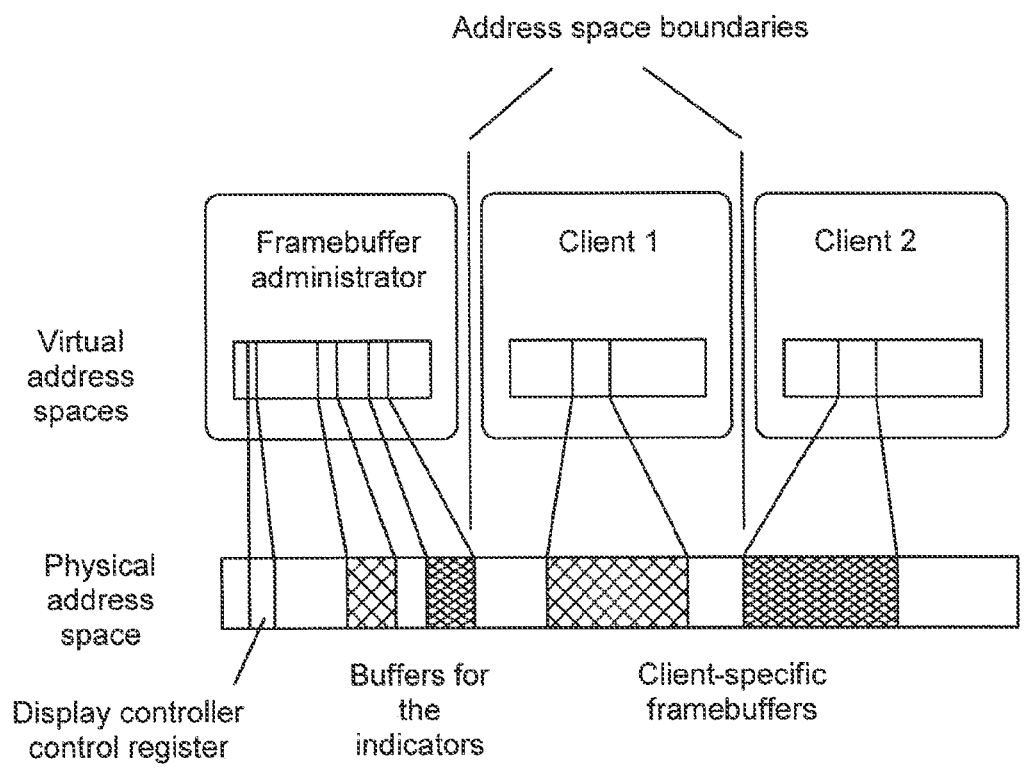
FIG. 1c is a schematic depiction of the organisation of the framebuffer in a method as shown in FIG. 1b.

This approach restricts the position of the indicator and makes additional demands on the alignment of the framebuffer memory and thus leads to restrictions for using optimisation techniques such as double buffering. In particular alignment describes the orientation of memory addresses towards certain typical values, often the multiple of a power of 2, here particularly a multiple of the page size. This method is known, e.g. as implementation in the scope of L4Re (www.os.info.tu-dresden.de/L4Re). FIG. 1c shows an example of a division of the physical address space according to the prior art. Here an example I is described how a non-forgeable indicator can be implemented; in this case efficiently but inflexibly. FIG. 1c shows only in general address space isolation: Three processes having stored different "virtual perspectives". FIG. 1c does not directly belong in this context. In order to illustrate how isolation is used in the context of possibility I, areas with the same hatching would have to be drawn adjacently. This particular memory unit management, however, is complex and has limited possibilities.

Consequently, alternative or improved methods for displaying a forgery-proof identity indicator are needed.

The present invention provides a new, flexible and efficient method for displaying a forgery-proof identity indicator.

In an embodiment, the present invention provides a method for displaying a forgery-proof identity indicator on a screen by means of a display controller displaying the content of a memory unit of a graphic circuit on the screen. The method according to the invention comprises preferably at least one of the following steps. At first a graphic to be displayed on the screen is written into a client-specific region of the memory unit of the graphic circuit by means of a client application (it is drawn). An identity indicator belonging to the client application is written into a memory region outside of the client-specific region (it is drawn). The identity indicator belonging to the client application is the identity indicator by means of which the user can decide whether the client application has been manipulated (forged) or not. The content of the client-specific region of the memory of the graphic circuit is displayed on the screen using the display controller. At the same time, the identity indicator stored in the memory region outside of the client-specific region is displayed on the screen using an overlay functionality of the display controller. The display controller is preferably implemented as hardware. In other words, with this division into various regions of the memory it can be ensured that only a trustworthy display controller has access to the region outside of the client-specific region, i.e. only the overlay functionality of the display controller as well as a trustworthy third software component (framebuffer administrator) are allowed to access the region outside of the client-specific region, which means that the display of the identity indicator is secure or forgery-proof.

The method of the invention is preferably suitable for any kind of screens where a display controller provides an overlay function/overlay functionality, e.g. the display of a smartphone, laptop, PCs or smart TVs.

A framebuffer administrator preferably controls the drawing (buffering) of the graphic into the client-specific region and/or the drawing of the identity indicator into the memory region outside of the client-specific region. In order to display a secure identity indicator the framebuffer administrator is preferably trustworthy and more preferably certified. Moreover, it is preferred that the framebuffer administrator is implemented as software.

According to a further preferred embodiment, the memory unit can have at least one, preferably two, more preferably several visible framebuffers, wherein preferably the content of each framebuffer can be displayed by the display controller on the screen.

According to a further preferred embodiment, drawing of an identity indicator belonging to the client application can be controlled by a status indicator which preferably communicates with the framebuffer administrator or is part thereof.

By using the overlay functionality both the display of the identity indicator and the graphic can be displayed simultaneously on the screen, wherein the identity indicator preferably overlays the client application.

For example, the client-specific region may be a first overlay buffer and the memory region outside of the client-specific region can be a second overlay buffer.

The method according to the invention is preferably also implemented as computer system with embodiments suitable or adapted for carrying out a method.

Eventually, the invention may also be realised as computer program product which can be loaded directly into the internal memory of a digital computer and comprises software code portions with which the corresponding steps according to the method of the invention can be carried out when the product is run on a computer.

In the present invention preferably the overlay functionality of a display controller is used in order to display a secure identity indicator visible for the user on the screen.

Preferably, the framebuffer administrator requires neither knowledge about how the client (i.e. the application) generates the content of the framebuffer nor is active intervention of the process required. These characteristics are preferably achieved in that the framebuffer administrator configures the display controller such that said controller directly displays a client-specific framebuffer. The identity indicator is preferably written in a memory region which can be disjoint, unlike the other solutions (see FIGS. 1a and 1b), and is combined with the client-controlled graphic by means of overlay functionality. Thus, preferably additional copy processes as well as additional alignment considerations as necessary in the prior art are no longer required (see FIGS. 1a, 1b and 1c). The present invention differs from the existing methods for example in that the memory region in above-discussed possibility I may not be disjoint (at any rate not in the physical address space). When a system MMU is used (as has been introduced by ARM) this limitation also no longer applies to I, the alignment restriction, however, remains.

The method of the invention can generally be used in combination with any monitor, e.g. in the field of smartphones, laptops, PCs and smart TVs, etc.

Figure 2:
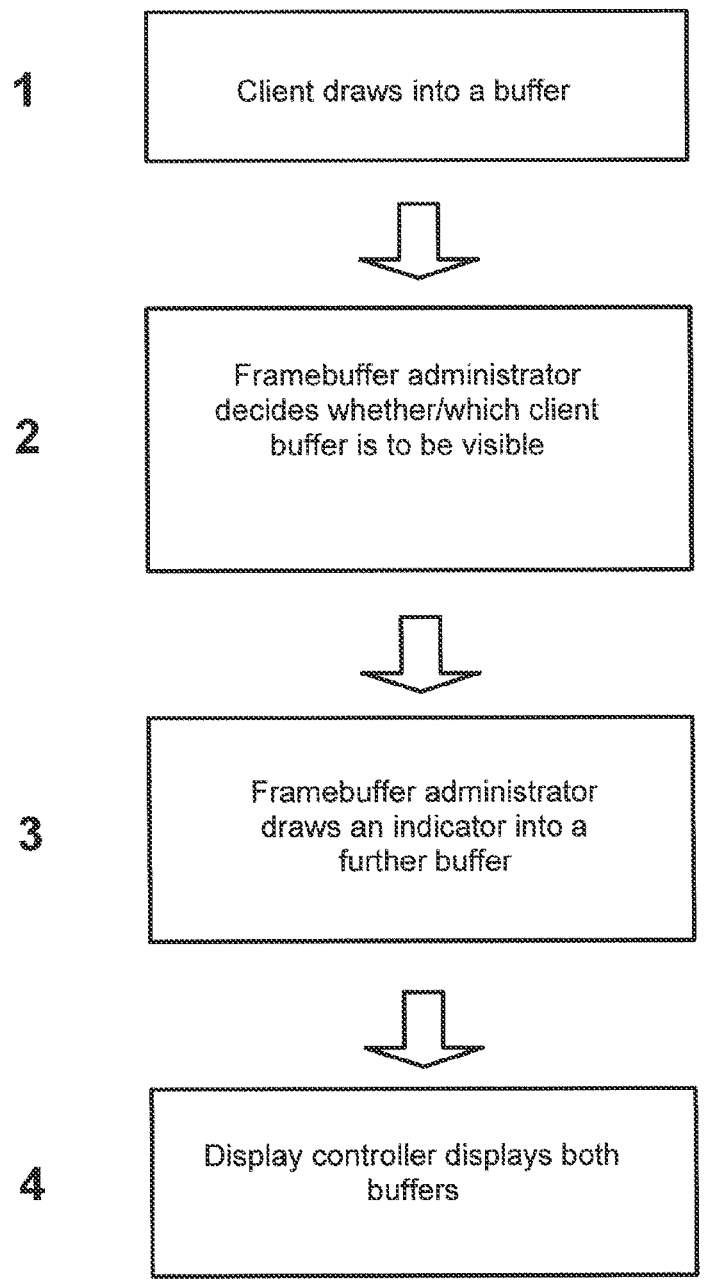
FIG. 2 is a flow diagram of a method according to the invention wherein a framebuffer administrator configures the display controller such that the controller directly displays a client-specific framebuffer.
Figure 3:
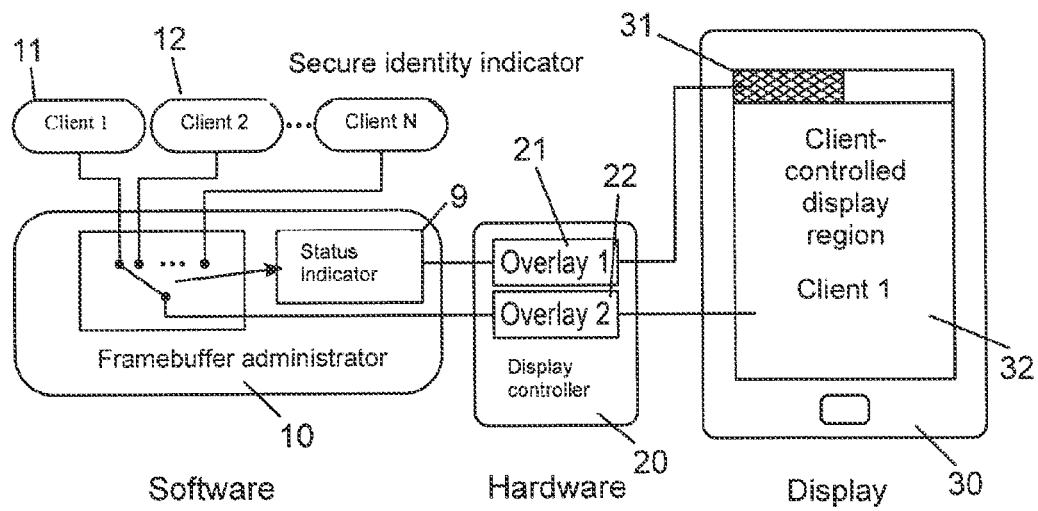
FIG. 3 is a schematic interaction of software, hardware and display (screen) according to the present invention.
Figure 4:
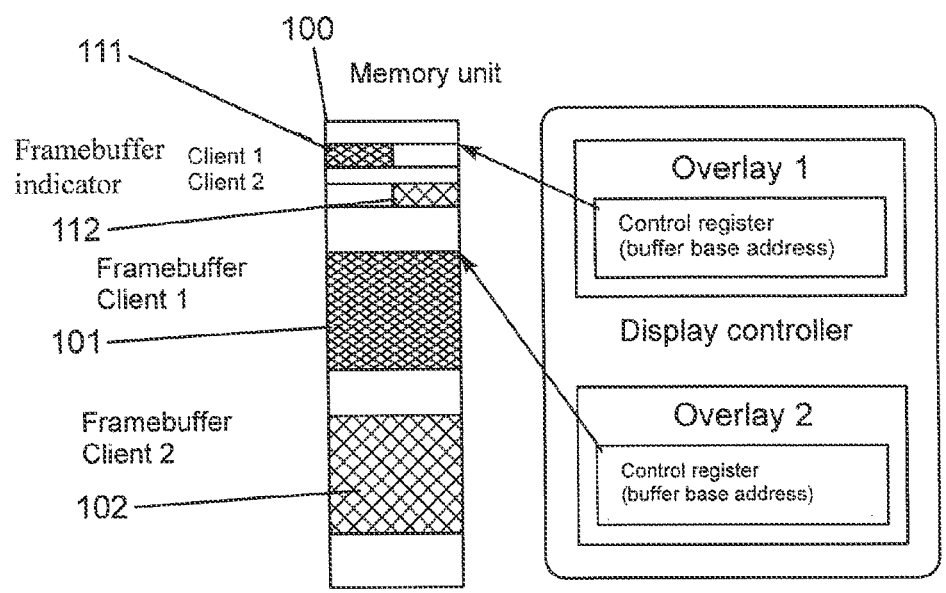
FIG. 4 is a schematic depiction of a memory unit containing the graphics of client-specific applications as well as corresponding identity indicators.

FIG. 2 shows a flow diagram of a method according to the invention. In a first Step 1, an application (client) writes or draws information to be displayed on the screen in a suitable memory unit (buffer; framebuffer). This memory unit is preferably the memory unit of a graphic circuit. Moreover, it can be possible that not only a first client (client 1) but also a second client (client 2) writes information to be displayed on the screen into the memory unit (buffer) (see FIG. 3). The invention, however, is not restricted to two applications so that preferably N, with NEIL, applications can write/draw in the buffer. The regions which are written on by the corresponding applications/clients are also called client buffer in the following. FIG. 4, for example, shows two different client buffers 101 and 102 in the memory unit 100 which are stored at various places within the memory unit 100 (framebuffer client 1, framebuffer client 2).

In a second Step 2, a framebuffer administrator 10 decides whether or which client buffer of the framebuffer is to be visible, i.e. to be displayed on the screen. For example the framebuffer administrator 10 can be implemented as software to control which client controls the display (routing). This controlling is schematically shown in FIG. 3 as switch, i.e. the framebuffer administrator 10 controls which of the various clients from the list: client 1, client 2, . . . , client N is to be displayed on the screen. Here it should be noted that the shown switch is to be interpreted purely schematically, i.e. it can be switched between various clients. According to the example shown in FIG. 3, the framebuffer administrator 10 determines that client 1 controls the display, i.e. the entire display 32 on the screen 30 is determined by client 1. Therefor the image to be displayed is written in the hardware (e.g. graphic card) in a certain memory region; here the region "overlay 2". The content of overlay 2 is subsequently sent from display controller 20 to the screen 30 so that a part of the screen display 32 shows the content as determined by client 1. In other words, a part of the screen display is the exact image of the digital representation from overlay 2.

Moreover, the framebuffer administrator 10 passes on the information which client determines the screen display to a status indicator (see FIG. 3). Preferably, the status indicator 9 is also implemented as software. By means of the status indicator it can be controlled or shown which client is responsible for the display on the screen 30. In particular, the secure (identity) indicator 31 of the invention is based on the status indicator 9. In other words, the components shown on the left in FIG. 3 are software components of the invention which control, i.a. the secure indicator 31 and switch the secure framebuffer between various clients.

The content of the status indicator 9 is then preferably conveyed to the hardware of the graphic circuit. The status indicator 9 also draws/writes an identity indicator into a buffer in the framebuffer/memory unit 100, however, preferably in another framebuffer region of the hardware, here in the "overlay 1". Due to the overlay functionality of display controllers, the display controller 20 can now simultaneously display both the overlay 2 region and the overlay 1 region on the screen, wherein the overlay 1 region overlays the overlay 2 region with the identity indicator so that the secure identity indicator 31 is always displayed on the screen.

The display controller 20 is implemented in the hardware, wherein the display controller 20 can display at least two different buffers here overlay 1 and overlay 2. Accordingly, the screen or the display is divided into a client-controlled display and a display of the identity indicator (see display on the right in FIG. 3). According to the invention, this capability of known display controllers with overlay functionality is expertly used in order to combine the client-generated contents with the identity indicator.

FIG. 4 shows that both the routing and the content of the indicator buffers are protected from manipulation in that the framebuffer administrator has exclusive control. The protection of the indicator buffers is ensured by a hardware mechanism of the CPU which is under operating system control. In particular, FIG. 4 exemplarily shows how the display controller of the invention can be controlled. Thus, control takes place in that the control registers are set to the base addresses of the indicator buffer or framebuffers of client 1. When the content of the framebuffer of client 1 becomes visible, the indicator signals it. In particular, indicators are all of the lines and not only the hatched areas of 111 and 112.

The invention also comprises the exact expressions, features, numeric values or regions and the like, when these expressions, features, numeric values or regions have been mentioned beforehand or subsequently in combination with expressions such as, e.g. "about, circa, around, basically, in general, at any rate, at least" etc. (i.e. "about 3" also comprises "3" or "basically radially" also comprises "radially"). The expression "respectively" moreover means "and/or".

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for displaying a secure or forgery-proof identity indicator on a screen, the method comprising:
   storing a graphic corresponding to a client application to be displayed on the screen into a client-specific buffer of a memory of a hardware graphic circuit;
   storing an identity indicator belonging to the client application into a secure buffer of the memory of the hardware graphic circuit, the secure buffer being separate from the client-specific buffer;
   displaying the graphic from the client-specific buffer on the screen using a display controller of the hardware graphic circuit; and simultaneously displaying the identity indicator from the secure buffer on the screen using an overlay functionality of the display controller;

wherein access to the secure buffer for displaying the identity indicator is restricted except to the display controller to facilitate secure or forgery-proof display of the identity indicator.

2. The method according to claim 1, wherein the screen is the display of a smartphone, laptop, personal computer (PC) or smart television (TV).

3. The method according to claim 1, wherein storing the graphic and/or the identity indicator is controlled by a framebuffer administrator.

4. The method according to claim 3, wherein the framebuffer administrator is certified.

5. The method according to claim 1, wherein storing the identity indicator belonging to the client application is controlled by a status indicator.

6. The method according to claim 1, wherein upon simultaneous display the display of the identity indicator overlays the graphic of the client application.

7. A tangible, non-transitory processor-readable medium having processor-executable instructions stored thereon for displaying a secure or forgery-proof identity indicator on a screen, wherein the processor-executable instructions, when executed by a processor, facilitate performance of the following:

storing a graphic corresponding to a client application to be displayed on the screen into a client-specific buffer of a memory of a hardware graphic circuit;

storing an identity indicator belonging to the client application into a secure buffer of the memory of the hardware graphic circuit, the secure buffer being separate from the client-specific buffer;

displaying the graphic from the client-specific buffer on the screen using a display controller of the hardware graphic circuit; and simultaneously displaying the identity indicator from the secure buffer on the screen using an overlay functionality of the display controller;

wherein access to the secure buffer for displaying the identity indicator is restricted except to the display controller to facilitate secure or forgery-proof display of the identity indicator.

8. A hardware graphic circuit for displaying a secure or forgery-proof identity indicator on a screen, comprising:

a memory, wherein the memory comprises a client-specific buffer and a secure buffer separate from the client-specific buffer, the client-specific buffer being configured to store a graphic corresponding to a client application to be displayed on the screen, and the secure buffer being configured to store an identity indicator belonging to the client application; and a display controller, configured to cause the graphic from the client-specific buffer to be displayed on the screen simultaneously with the identity indicator from the secure buffer using an overlay functionality;

wherein access to the secure buffer for displaying the identity indicator is restricted except to the display controller to facilitate secure or forgery-proof display of the identity indicator.

* * * * *